US012500769B2

(12) United States Patent
Anadollu

(10) Patent No.: US 12,500,769 B2
(45) Date of Patent: Dec. 16, 2025

(54) AUTHENTICATION SYSTEM AND METHOD WITH ZERO-KNOWLEDGE PROOF

(71) Applicant: OREMA YAZILIM ANONİM ŞİRKETİ, Antalya (TR)

(72) Inventor: Sertaç Anadollu, Antalya (TR)

( * ) Notice: Subject to any disclaimer, the term of this patent is extended or adjusted under 35 U.S.C. 154(b) by 38 days.

(21) Appl. No.: 18/730,250

(22) PCT Filed: Apr. 28, 2023

(86) PCT No.: PCT/TR2023/050399
§ 371 (c)(1),
(2) Date: Jul. 18, 2024

(87) PCT Pub. No.: WO2024/123274
PCT Pub. Date: Jun. 13, 2024

(65) Prior Publication Data
US 2025/0150275 A1    May 8, 2025

(30) Foreign Application Priority Data
Dec. 6, 2022 (TR) ................. 2022/018616

(51) Int. Cl.
*H04L 9/32* (2006.01)
*G06F 21/31* (2013.01)

(52) U.S. Cl.
CPC ................. *H04L 9/3218* (2013.01)

(58) Field of Classification Search
CPC ................................... H04L 9/3218
See application file for complete search history.

(56) References Cited

U.S. PATENT DOCUMENTS

| 11,100,197 | B1* | 8/2021 | Bernardi | H04L 51/18 |
| 11,128,467 | B2* | 9/2021 | Chapman | H04L 9/3236 |
| 11,700,133 | B2* | 7/2023 | Hong | H04L 9/3218 |
| | | | | 713/157 |
| 12,003,660 | B2* | 6/2024 | Bernardi | H04L 67/104 |
| 12,155,781 | B1* | 11/2024 | Helfgott | H04L 9/3239 |
| 2020/0219099 | A1* | 7/2020 | Mohassel | H04L 9/3218 |
| 2021/0297255 | A1* | 9/2021 | Wan | H04L 63/0442 |
| 2023/0216947 | A1* | 7/2023 | Bernardi | H04L 67/10 |
| | | | | 713/150 |
| 2023/0298015 | A1* | 9/2023 | Kiraz | H04L 9/0861 |
| 2024/0370865 | A1* | 11/2024 | Bernardi | G06Q 20/36 |
| 2025/0030666 | A1* | 1/2025 | Chalkias | H04L 63/0428 |
| 2025/0097212 | A1* | 3/2025 | Ihsanullah | H04L 63/0442 |
| 2025/0141673 | A1* | 5/2025 | Kärkkäinen | H04L 9/0869 |

(Continued)

FOREIGN PATENT DOCUMENTS

| CN | 113724078 A | 11/2021 |
| CN | 113806059 A | 12/2021 |
| TR | 2021/021304 A2 | 1/2022 |

OTHER PUBLICATIONS

International Search Report for corresponding PCT/TR2023/050399 dated 2023-06-21.

(Continued)

*Primary Examiner* — Gary S Gracia
(74) *Attorney, Agent, or Firm* — Egbert, McDaniel & Swartz, PLLC

(57) ABSTRACT

Disclosed is a system and method for authentication with zero-knowledge proof used in environments where authentication is required.

2 Claims, 1 Drawing Sheet

(56) References Cited

U.S. PATENT DOCUMENTS

2025/0202708 A1* 6/2025 Parthe .................... H04L 9/50
2025/0315901 A1* 10/2025 Rajasingham ............ H04L 9/50

OTHER PUBLICATIONS

Written Opinion of the International Searching Authority for corresponding PCT/TR2023/050399 dated Jun. 21, 2023.
Mlmaz B et al. "Improving WebRTC Security via Blockchain Based Smart Contracts," 2020 International Symposium on Networks, Computers and Communications (ISNCC), Montreal, QC, Canada, 2020, pp. 1-6, doi: 10.1109/ISNCC49221.2020.9297333.

* cited by examiner

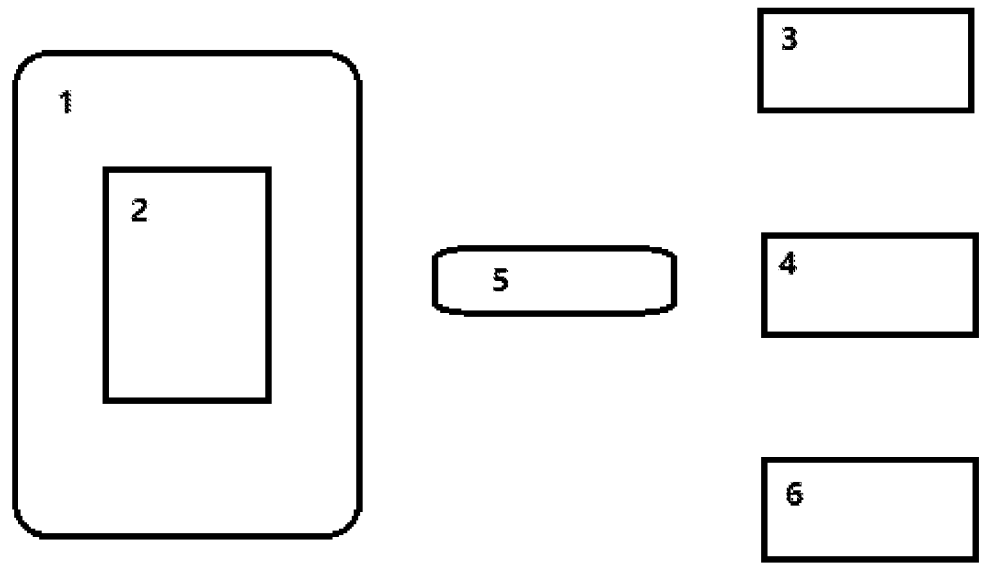

AUTHENTICATION SYSTEM AND METHOD WITH ZERO-KNOWLEDGE PROOF

TECHNICAL FIELD

The invention relates to a system and method for authentication with zero knowledge proof used in environments where authentication is required.

STATE OF THE ART

Authentication is a process that ensures that an individual's identity matches the genuine information. Especially in environments where there is a risk of identity theft, authentication becomes very important. The authentication process ensures that there is a real individual behind a transaction and that this individual is the individual they claim to be. In this way, an individual is prevented from making an unauthorized transaction on behalf of another individual for fraudulent purposes. In face-to-face authentication, the process starts by visiting premises of the institution where the service will be received, such as bank branches, dealers, and public offices. A photocopy of the identity document is given, application forms are filled in and the authentication process is carried out. This process is both time consuming and costly. In the digital authentication process, identity can be verified end-to-end online through digital channels, for example via mobile phones, without going to the relevant institutions. The front and back images of an ID card are taken using the camera of the mobile phone, tablet, or similar mobile device. If the mobile device supports NFC technology, the identity information in the chip in the ID card is read. Identity verification is done with identity photos, data in the chip and video interview, which is one of the secure authentication processes. During the interview, artificial intelligence-supported liveness analysis and biometric analysis are performed to verify that the other person is a real individual. The photos on any documentary proof of identity, analysis and verification proofs are stored in the system of the relevant institution and the process is completed. Identity verification is a fundamental requirement in most processes and procedures, both online and offline, in all kinds of situations, from opening a bank account to completing tax transactions electronically. The systems and methods used in the state of the art is listed as follows:

Presentation of a Documentary Proof of Identity in Person:

Person's own documentary proof of identity such as ID card, driver's license, passport, etc. are presented when entering the relevant environment from outside. The person in charge of controlling the entries in the relevant institution or organization visually checks such documents or keeps them until the person is permanently leaves the environment. In this way, the person performing the identity check also possesses the information that he/she is only obliged to check. This situation brings with it risks such as duplication, copying, etc. of the relevant documentary proof of identity. This method inevitably leads to a breach of "Data Privacy and Security".

Access from Network Environment:

In the network access method, authentication is performed by interacting with the digital interface presented to individuals who log into the relevant environment. For example, in order to access the Internet service offered in a café, guests digitally authenticate themselves. When guests select the relevant Wi-Fi network and want to connect thereto, they are asked for personal information such as Citizen Identification No, telephone number, e-mail address, and etc. Sharing personal information becomes a necessity for users who cannot receive the relevant service without sharing such information. Similarly, for the services offered specific to the environment of any business, hardware device-specific information such as device ID, MAC address, etc. is also shared with the other parties.

Card Control Systems:

In this method, which is authenticated with RF-ID, magnetic, encrypted, etc. methods, there are possibilities of user cards being compromised, lost, deformed, etc. Individuals must keep these cards with them at all times for verification processes. In some processes, they can mislead the system by handing such cards to other individuals.

Biometric Verification Systems:

It is a method in which biometric information is controlled by systems equipped with sensors such as cameras, fingerprint readers, infrared scanners, etc. Although the accuracy rate is high, installation and maintenance costs are high. It is inevitable for people to share their personal biometric data such as face, fingerprint, etc.

As a result of the search on the subject, application number TR2021/021304 has been found. The application relates to a system that enables fraud prevention through authentication. However, the application does not mention a system and method that enables authentication with zero knowledge proof.

Consequently, due to the above-mentioned drawbacks and the inadequacy of the existing solutions, a development in the relevant technical field has become necessary.

OBJECT OF THE INVENTION

The invention is inspired by existing situations and aims to solve the above-mentioned problems.

The main object of the invention is to enable authentication with zero-knowledge proof used in environments where authentication is required.

Another object of the invention is to enable authentication in accordance with "Data Privacy and Security" on mobile devices where user digital identities are stored, using GROTH 16, one of the zk-SNARK schemes, without sharing any personal information with third parties.

In order to fulfil the above-mentioned purposes, the invention is a system that enables authentication with zero knowledge proof in environments that require authentication, comprising a modem that provides Internet infrastructure through wireless access to the environment where it is located, a signaling device that connects to their environment and emits a Bluetooth signal to give the environment an identity, the server that maintains the WEB services of the environment and transmits the evidence in the verification process, electronic device that receives the signal transmitted from the signal transmitter in the environments by means of Bluetooth and Wi-Fi signal receivers therein, and an application that is located in the electronic device, interprets the signal received by the electronic device, authenticates the information contained in the digital identity of the users through the GROTH16 scheme via the Mina blockchain, and communicates the authenticated user with the WEB RTC channel of the service provider of the relevant environment.

In order to fulfil the above-mentioned purposes, the invention is a method that enables authentication with zero knowledge proof in environments where authentication is required, and includes the following process steps: Broadcasting the signal in Bluetooth and/or Wi-Fi protocol by means of a signal transmitter in the environment where the "Authentication and Authorization" process will be performed, Reading the Bluetooth or Wi-Fi signals broadcast from the environment via the mobile application on the user's mobile device, Linking the read signals with the relevant environment via the mobile application, Transmitting the information required for the Authentication and Authorization process to the user, Generation of the proof required for the authentication process using the GROTH 16 scheme, Completion of the user's authentication process on the Mina blockchain, The verified user is routed to the WEB RTC channel to be communicated, Completion of the communication and opening of the WEB RTC communication channel, and Presentation of the services and/or options offered in the relevant environment to the user through the mobile application.

The structural and characteristics and all advantages of the invention will be more clearly understood by means of the FIGURES given below and the detailed description provided with references to these FIGURES, and therefore, the evaluation should be made by considering these FIGURES and detailed description.

FIGURES TO HELP UNDERSTAND THE INVENTION

FIG. 1 is a representative illustration of the inventive zero-knowledge proof authentication system and method.

DESCRIPTION OF PART REFERENCES

1. Electronic device
2. Application
3. Modem
4. Signal transmitter
5. Blockchain
6. Server

DETAILED DESCRIPTION OF THE INVENTION

In this detailed description, the preferred embodiments of the inventive zero-knowledge proof authentication system and method are described only for the purpose of better understanding the subject matter.

The zero-knowledge proof authentication system comprises electronic device (1), mobile application (2), modem (3), signal transmitter (4), blockchain (5) and server (6).

The electronic device (1) hosts the mobile application (2) and services with which the authentication process and the subsequently established WEB RTC channel will communicate. In an alternative embodiment of the invention, the electronic device (1) is a smart phone. Thanks to the Bluetooth and Wi-Fi signal receivers of smart phones, it has the ability to capture the signals emitted from the modem (3) or signal transmitter (4) in the relevant environment. It also runs mobile application (2) packages thanks to the operating system it may have.

Application (2) interprets the relevant environment by interpreting the Bluetooth and Wi-Fi signals needed in the environments. According to the authentication requirements of the interpreted environment, the information in the digital identity is authenticated through this application (2) via the GROTH 16 scheme on the Mina Blockchain (5). The authenticated user is one of the parties of the relevant service provider communicating through WEB RTC. As for the data exchange between the service provider and the user, the processes on the user side are managed through the mobile application (2). It interprets the Wi-Fi and Bluetooth signals received from the sensors of the Smartphone within the mobile application (2). Mobile applications (2) can interact with protocols such as HTTP, HTTPS, WEB RTC, deep link etc. using services and other applications (2). It is possible to manage the content to be offered to users therefrom.

Modem (3) broadcasts the Internet infrastructure of the environment. Thanks to the wireless access infrastructure it offers, it provides the necessary interpretation data for the interactions of the users accessing the relevant environment.

The signal transmitter (4) emits Bluetooth signals in the environment in which they are placed, with low energy consumption, assigning the environment an identity. The Mina blockchain (5) provides the blockchain (5) environment where the decentralized authentication takes place.

GROTH16 serves the role of zk-SNARK (zero-knowledge succinct non-interactive argument of knowledge), which makes it possible to authenticate with Zero-Knowledge proof. It is used to verify the information requested from users with the encryption scheme it offers. WEB RTC is an open communication technology that enables the use of voice, video and data communication on the web browser. WEB RTC is the protocol through which the authenticated user will communicate with the service provider.

Server (6) is a server that maintains the WEB services of the relevant service provider, to which the proof in the authentication process is transmitted.

Within the scope of the zero-knowledge proof authentication method:

In the environment where the "Authentication and Authorization" process will be performed, the signal is broadcast via Bluetooth or Wi-Fi protocol, The Bluetooth or Wi-Fi signals emitted from the environment are read via the "Kontak" mobile application (2) installed on the user's mobile device, The signals, which have been read, are associated with the relevant environment in the "Kontak" mobile app (2), The information required for the Authentication and Authorization process is transmitted to the user, The proof required for the verification process is generated using the GROTH 16 scheme, User authentication is completed on the Mina blockchain (5), Authenticated user communication is routed to the WEB RTC channel, Communication is completed, and then the WEB RTC communication channel is opened; and The services and options offered in the relevant environment are available to the user through the "Kontak" mobile application (2).

In this way, users do not have to share any personal information with service providers or third parties during the "Authentication and Authorization" processes in the environments, and the necessary authentication is done with the "Zero-Knowledge Proof" method.

Using GROTH 16, one of the zk-SNARK schemes, the user's digital identities are stored on their mobile devices in accordance with the requirements of "Data Privacy and Security".

In the zero-knowledge authentication system, "Wi-Fi Modems (3)" or signal transmitters (4) (Bluetooth Low Energy Beacon) are installed in the environments. Individuals who enter these environments interpret the signals broadcast in the environment thanks to the application (2) on their mobile devices. The mobile application (2), which recognizes in which environment the individual is located, queries the necessary authentication information. It generates proof to verify this information required for authentication through the Mina blockchain (5) with the GROTH 16 scheme. The generated proof is transmitted to the service provider's servers. The authenticated user receives the data required to provide a WEB RTC connection. The user provides WEB RTC connection by processing the relevant data. Through this channel created between the service provider and the user, content is offered to the users. This opens a channel for the authenticated user to interact with the service provider. Through this channel, the services to be presented in the relevant environment are delivered to the users.

The invention claimed is:

1. A system that enables authentication with zero knowledge proof in environments where authentication is required, the system comprising:
    a modem that provides Internet infrastructure via wireless access to environment;
    a signal transmitter that is connected to environments in which they are located and assigns identity to the environment by emitting a Bluetooth signal;
    a server that maintains the WEB services of the environment, and where the proof in the authentication process is transmitted to;
    an electronic device that receives the signal transmitted from the signal transmitter in the environments through the Bluetooth and Wi-Fi signal receivers in the electronic device; and
    an application which is installed in the electronic device, interprets the signal received by the electronic device, authenticates the information contained in the digital identity of users through the GROTH16 scheme via a Mina blockchain, and communicates with the authenticated user through the WEB RTC channel of the service provider of the relevant environment.

2. A method that enables authentication with zero-knowledge proof in environments with authentication requirements, comprising the following process steps:
    broadcasting a signal in Bluetooth and/or Wi-Fi protocol by means of a signal transmitter in an environment where a "Authentication and Authorization" process will be performed;
    reading the Bluetooth or Wi-Fi signals emitted from the environment via a mobile application on a user's mobile device;
    linking the read signals with the relevant environment via the mobile application;
    transmitting the information required for Authentication and Authorization to the user,
    generating the proof required for the verification process using a GROTH 16 scheme;
    completing the authentication process on a Mina blockchain;
    routing the authenticated user to a WEB RTC channel to be contacted;
    completing the communication and opening the WEB RTC communication channel; and
    presenting services and/or options offered in the relevant environment to the user through the mobile application.

* * * * *